US 7,970,959 B2

(12) United States Patent
Kuroki et al.

(10) Patent No.: US 7,970,959 B2
(45) Date of Patent: Jun. 28, 2011

(54) DMA TRANSFER SYSTEM USING VIRTUAL CHANNELS

(75) Inventors: Kenichiro Kuroki, Kawasaki (JP); Kenji Sato, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 11/360,609

(22) Filed: Feb. 24, 2006

(65) Prior Publication Data

US 2007/0073924 A1    Mar. 29, 2007

(30) Foreign Application Priority Data

Sep. 15, 2005  (JP) ................................. 2005-268217

(51) Int. Cl.
  *G06F 3/00* (2006.01)
  *G06F 13/00* (2006.01)
(52) U.S. Cl. .......................................... 710/22; 710/40
(58) Field of Classification Search .................... 710/22; 711/159
  See application file for complete search history.

(56) References Cited

U.S. PATENT DOCUMENTS

| | | | |
|---|---|---|---|
| 4,901,234 A | | 2/1990 | Heath et al. |
| 5,875,352 A | * | 2/1999 | Gentry et al. .................... 710/23 |
| 6,260,081 B1 | | 7/2001 | Magro et al. |
| 6,418,489 B1 | * | 7/2002 | Mason et al. .................... 710/22 |
| 6,487,628 B1 | * | 11/2002 | Duong et al. .................. 710/313 |
| 2003/0061431 A1 | * | 3/2003 | Mears et al. .................... 710/305 |
| 2004/0093438 A1 | * | 5/2004 | Odom .............................. 710/22 |

FOREIGN PATENT DOCUMENTS

| | | |
|---|---|---|
| JP | 63-244158 | 10/1988 |
| JP | 6-509896 | 11/1994 |
| JP | 9-231161 | 9/1997 |
| JP | 2002-530778 | 9/2002 |
| JP | 2003-242098 | 8/2003 |
| JP | 2003-256356 | 9/2003 |

OTHER PUBLICATIONS

Japanese Office Action issued on Aug. 18, 2009 in corresponding Japanese Patent Application 2005-268217.

\* cited by examiner

*Primary Examiner* — Henry W Tsai
*Assistant Examiner* — Titus Wong
(74) *Attorney, Agent, or Firm* — Staas & Halsey LLP

(57) ABSTRACT

A DMA transfer system includes a DMA controller having at least one channel coupled to a system bus, the DMA controller configured to perform a DMA transfer via the system bus according to a DMA transfer setting of the at least one channel, and a DMAC control unit coupled to the DMA controller, wherein the DMAC control unit includes a plurality of virtual channels configured to have respective DMA transfer settings made thereto, a virtual channel arbiter configured to select one of the plurality of virtual channels, and a DMA setting circuit configured to read a DMA transfer setting of the selected virtual channel to write the read DMA transfer setting to the at least one channel of the DMA controller.

8 Claims, 16 Drawing Sheets

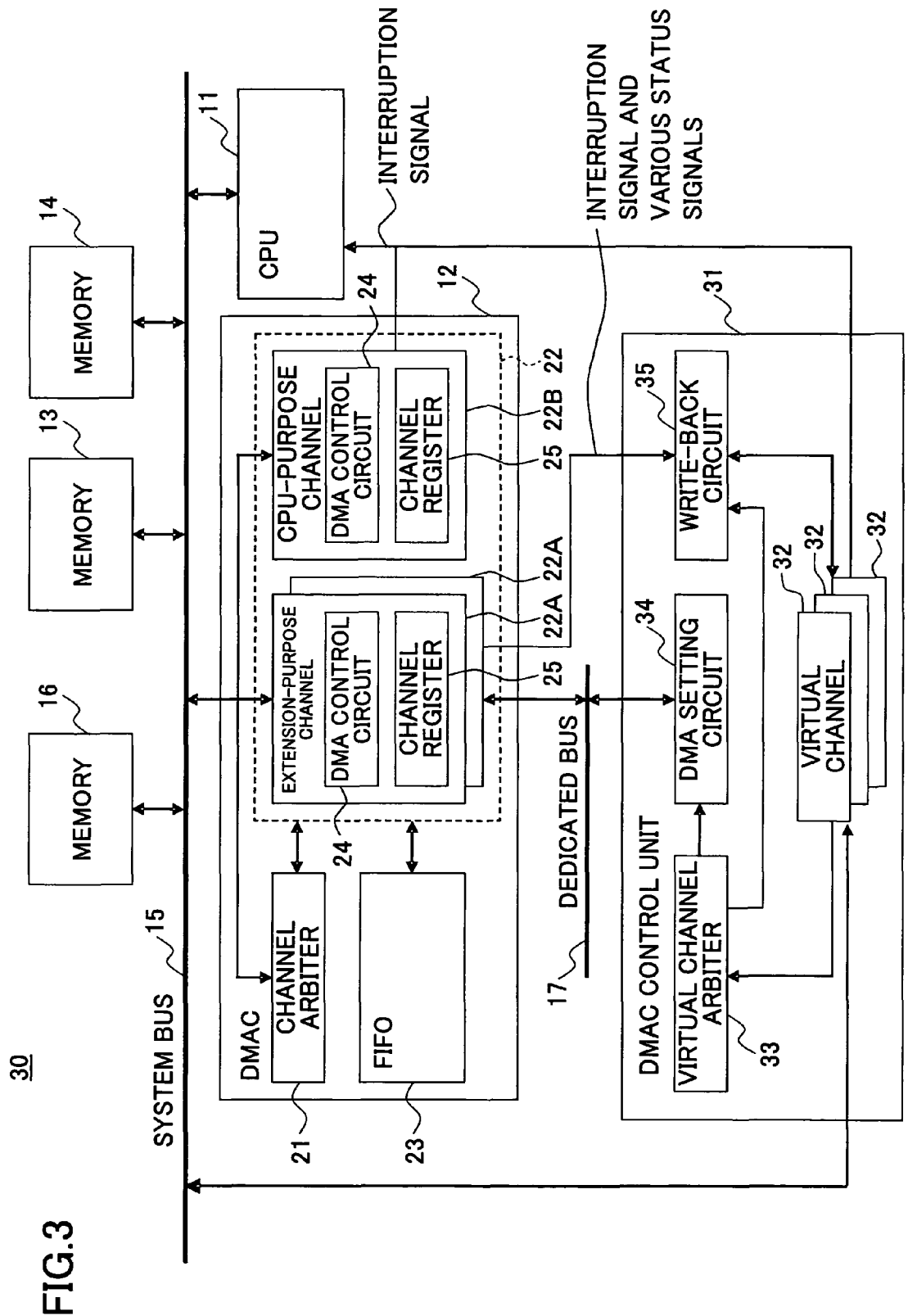

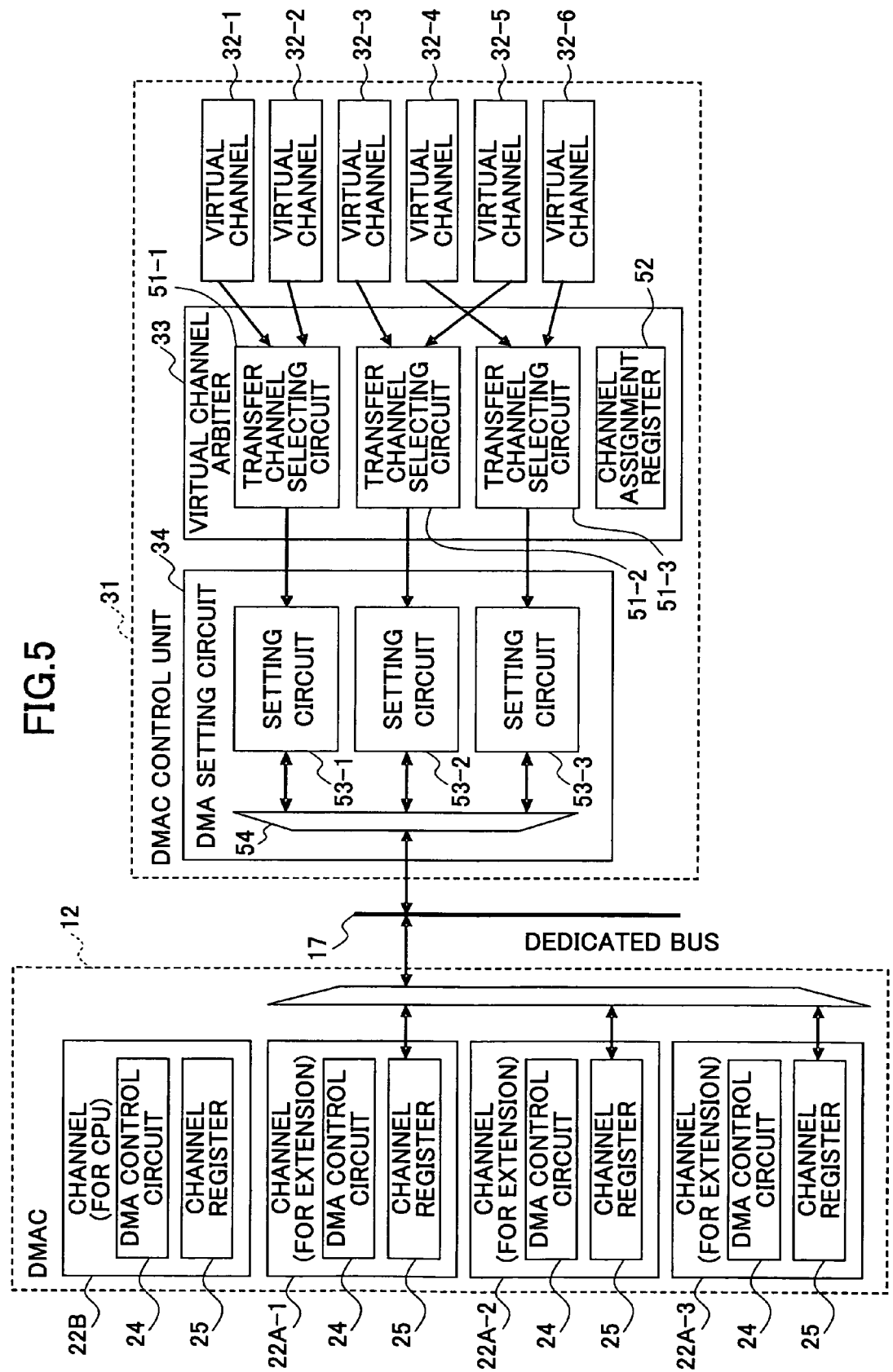

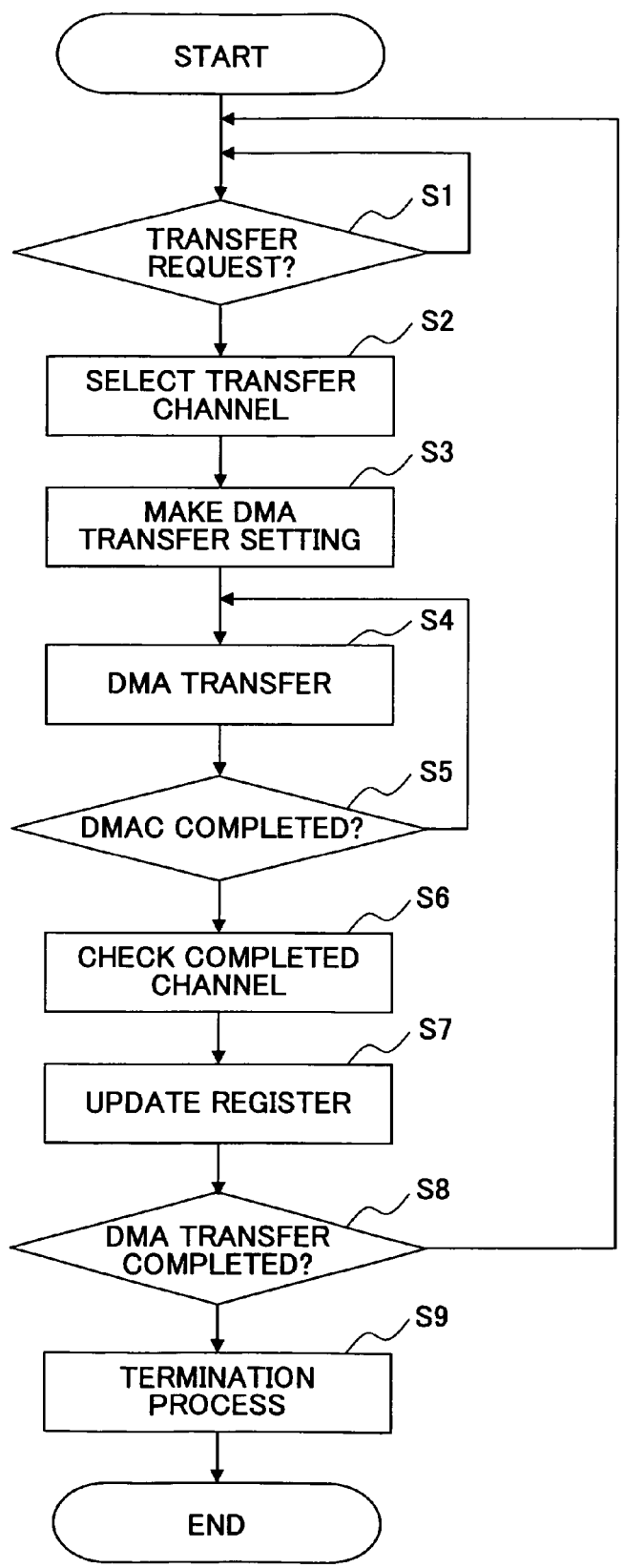

DMA TRANSFER SYSTEM USING VIRTUAL CHANNELS

CROSS-REFERENCE TO RELATED APPLICATIONS

The present application is based upon and claims the benefit of priority from the prior Japanese Patent Application No. 2005-268217 filed on Sep. 15, 2005, with the Japanese Patent Office, the entire contents of which are incorporated herein by reference.

BACKGROUND OF THE INVENTION

1. Field of the Invention

The present invention generally relates to data transfer systems, and particularly relates to a DMA transfer system.

2. Description of the Related Art

A DMA (Direct Memory Access) transfer system makes it possible to perform high-speed data transfer by transferring data directly from the transfer source to the transfer destination without using a CPU. FIG. 1 is a drawing showing an example of the configuration of a related-art DMA transfer system.

A DMA transfer system 10 shown in FIG. 1 includes a CPU 11, a DMA controller (DMAC) 12, a memory 13, a memory 14, and a system bus 15. The CPU 11, the DMA controller 12, the memory 13, and the memory 14 are connected to each other via a system bus 15.

The CPU 11 specifies a transfer source address, a transfer destination address, a transfer data size, the number of transfers, etc., for DMA, thereby making DMA transfer settings to the DMA controller 12. In response, the DMA controller 12 performs the specified DMA transfer. For example, the DMA controller 12 reads data with the size specified by the transfer data size from the transfer source address in the memory 13, and transfers the data to the transfer destination address in the memory 14. The DMA controller 12 performs this data transfer as many times as specified while successively incrementing or decrementing the transfer source address and the transfer destination address. With this provision, the CPU 11 can attend to other processing while the DMA transfer is performed.

The DMA controller 12 includes a channel arbiter 21, one or more channels 22, and a FIFO 23. The channels 22 correspond to respective DMA transfer processes that are performed independently of each other. If n channels are provided, n DMA transfer processes, which are independent of each other, can be performed. One channel 22 includes a DMA control circuit 24 and a channel register 25. DMA transfer settings by the CPU 11 as described above is performed with respect to the channel register 25 of each of the channels 22.

The channel register 25 includes registers such as a transfer request register, a transfer mode register, a transfer width register, a transfer count register, a transfer source address register, a transfer destination address register, and an option register. The transfer request register stores a setting indicative of the presence/absence of a transfer request. The transfer mode register stores a setting indicative of the type of transfer such as a single transfer or a burst transfer. The transfer width register stores a setting indicative of the width of transfer such as a byte/half word/word. The transfer count register stores a setting indicative of the number of data transfers performed by use of the above-noted transfer mode and transfer width. The transfer source address register stores a setting indicative of the address in memory from which data is to be read. The transfer destination address register stores a setting indicative of the address in memory to which data is to be written. The option register stores settings relating to transfer options that are not necessarily required for DMA transfer. Such settings includes a temporal pause, a forced suspension, the reloading of an address or the number of transfers upon the completion of transfer, the selection of the presence/absence of an interruption signal, etc. The CPU 11 makes these settings via the system bus 15.

The channel arbiter 21 ceaselessly checks the transfer request register of each of the channels 22. When there is a transfer request, a channel 22 that is going to perform the DMA transfer is selected according to a predetermined priority system from the plurality of channels 22 that are requesting transfer. The channel arbiter 21 notifies the selected channel 22 that it has been selected. When the channel 22 notified of its selection withdraws a transfer request after performing its transfer process, the channel arbiter 21 selects a channel 22 that is going to perform a next DMA transfer among the plurality of channels 22 that are requesting transfer.

The predetermined priority system that is used by the channel arbiter 21 to select a channel 22 to perform a DMA transfer may include the "fixed priority system" and the "rotating priority system". The fixed priority system uses fixed priority levels assigned to the channels, so that the channel having the highest priority is always selected for DMA transfer. This priority system is effective when it is clear as to what priority levels should be given to respective channels (transfer paths). In the rotating priority system, the priority levels rotate by using as a reference the channel that has performed the latest DMA transfer. This priority system is effective when all the transfers need to be performed in parallel without giving priority to a particular channel.

When the channel arbiter 21 selects a channel 22 and notifies of its selection, the DMA control circuit 24 of the channel 22 notified of its selection becomes the bus master of the system bus 15, and performs DMA transfer. Namely, the DMA control circuit 24 accesses the transfer source address (e.g., address in the memory 13) indicated by the transfer source address register via the system bus 15, thereby reading data with the data size specified by the transfer width register to the system bus 15. The read data is temporarily stored in the FIFO 23. Further, the DMA control circuit 24 writes the read data stored in the FIFO 23 to the transfer destination address (e.g., address in the memory 14) specified by the transfer destination address register by using the intervening system bus 15.

Upon the completion of the DMA transfer, the channel 22 having completed the DMA transfer withdraws the transfer request in its transfer request register, resulting in the DMA control circuit 24 asserting an interruption signal indicative of the completion of transfer.

In recent years, the number of transfers that need to be performed simultaneously has been on the increase due to an increase in the sophistication of various processes (e.g., multimedia processes) performed in systems. This leads to a demand to increase the number of channels implemented in a DMA controller. However, an increase in the number of channels implemented in a DMA controller leads to an increase in circuit size. In technical fields in which chip size and power consumption are important issues, such as in the case of LSI for mobile terminals, an increase in circuit size is extremely costly.

On the other hand, if the number of channels implemented in a DMA controller is small in comparison with the number of transfer paths simultaneously requested, the overall performance of the system may drop. In such a case, a configuration in which the CPU controls DMA transfers by arbitrating the transfer requests results in an increase in the load on the CPU. In order to reduce the load on the CPU, the number of channels in the DMA controller may be increased. Since the DMA controller is designed as hardware, however, it is difficult to increase/decrease only the number of channels. In consideration of this, the system may be configured such that a plurality of DMA controllers 12-1 through 12-3 are implemented as shown in FIG. 2. In this configuration, however, the plurality of DMA controllers 12-1 through 12-3 compete against each other in an attempt to capture the system bus 15 each time a given transfer comes to an end. Drop in performance is thus unavoidable. Also, the circuit size increases in accordance with the number of DMA controllers that are implemented.

Moreover, since transfer functions required of a DMA controller differ from system to system, the provision of a DMA controller only having simple transfer functions in each system cannot guarantee sufficient transfer performance. Because of this, it is preferable to design a DMA controller having transfer functions specialized for a particular system when the performance of a system is given emphasis. When a DMA controller designed in such manner is used in another system, however, the specialized transfer functions may not be made use of properly. This means that there is an excess circuitry. Further, if a DMA controller is designed such as to be optimized for each system, the process steps such as a design step, a development step, and a test step are required for each system. This is costly.

[Patent Document 1] Japanese Patent Application Publication No. 2003-256356

[Patent Document 2] Japanese Patent Application Publication No. 2003-242098

Accordingly, there is a need for a DMA transfer system that can increase the number of channels without causing an increase in circuit size, and that can provide sophisticated functions without being functionally specialized for a particular system.

SUMMARY OF THE INVENTION

It is a general object of the present invention to provide a DMA transfer system that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a DMA transfer system particularly pointed out in the specification in such full, clear, concise, and exact terms as to enable a person having ordinary skill in the art to practice the invention.

To achieve these and other advantages in accordance with the purpose of the invention, the invention provides a DMA transfer system which includes a DMA controller having at least one channel coupled to a system bus, the DMA controller configured to perform a DMA transfer via the system bus according to a DMA transfer setting of the at least one channel, and a DMAC control unit coupled to the DMA controller, wherein the DMAC control unit includes a plurality of virtual channels configured to have respective DMA transfer settings made thereto, a virtual channel arbiter configured to select one of the plurality of virtual channels, and a DMA setting circuit configured to read a DMA transfer setting of the selected virtual channel to write the read DMA transfer setting to the at least one channel of the DMA controller.

According to at least one embodiment of the present invention, the number of channels available in the system is equal to the number of virtual channels implemented in the DMAC control unit. It follows that the number of channels can be easily increased by adjusting the number of virtual channels. In this case, since it suffices for the DMA controller to have the same configuration as that of a conventional DMA controller, it is easy to increase the number of channels. If the number of channels is increased by use of the DMAC control unit, the circuit size increases only by an amount corresponding to the size of the registers for holding channel settings. An increase in circuit size associated with an increase in the number of channels can thus be kept to a minimum.

Further, with a configuration in which the virtual channels have expansion registers, these expansion registers can be utilized to achieve sophisticated transfer functions. For example, the CPU makes DMA transfer settings to the DMAC control unit only once, and, then, the DMAC control unit makes DMA transfer settings to the DMA controller multiple times, thereby making it possible to perform sophisticated control with respect to the DMA controller.

BRIEF DESCRIPTION OF THE DRAWINGS

Other objects and further features of the present invention will be apparent from the following detailed description when read in conjunction with the accompanying drawings, in which:

FIG. 3 is a drawing showing an example of the configuration of a DMA transfer system according to the present invention;

FIG. 5 is a drawing showing an example of a configuration in which a DMA setting circuit makes DMA transfer settings when a plurality of extension-purpose channels are provided in a DMA controller;

FIG. 6 is a flowchart of a DMA transfer process performed by the DMA transfer system shown in FIG. 3;

DESCRIPTION OF THE PREFERRED EMBODIMENTS

Figure 1:
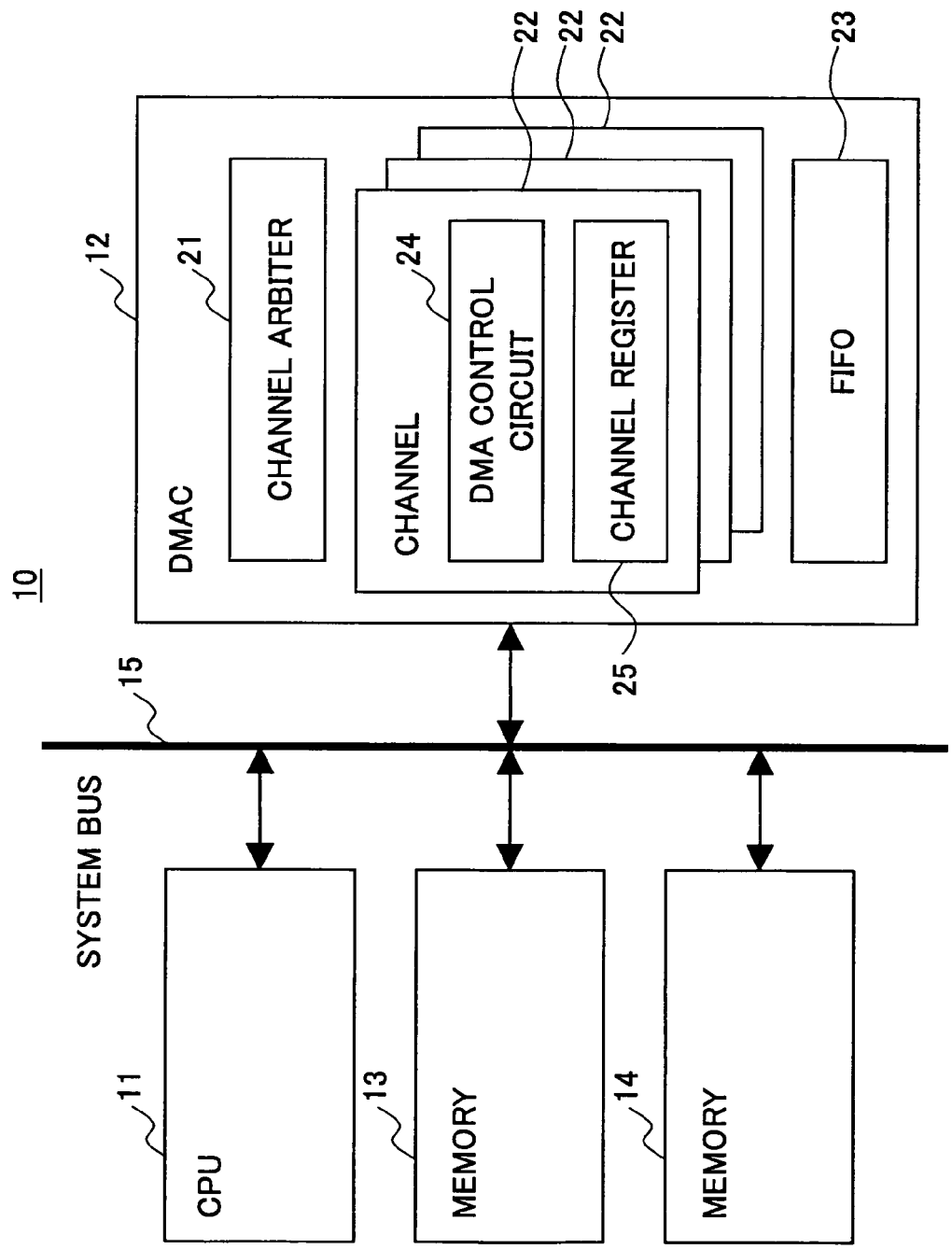
FIG. 1 is a drawing showing an example of the configuration of a related-art DMA transfer system.

In the following, embodiments of the present invention will be described with reference to accompanying drawings.

FIG. 3 is a drawing showing an example of the configuration of a DMA transfer system 30 according to the present invention. In FIG. 3, the same elements as those of FIG. 1 are referred to by the same numerals, and a description thereof will be omitted.

A DMA transfer system 30 shown in FIG. 3 includes a CPU 11, a DMA controller (DMAC) 12, a memory 13, a memory 14, a system bus 15, a memory 16, a dedicated bus 17, and a DMAC control unit 31. The CPU 11, the DMA controller 12, the memory 13, and the memory 14 are connected to each other via a system bus 15. The DMA controller 12 and the DMAC control unit 31 are coupled to each other via the dedicated bus 17 and predetermined signal lines. In theory, the dedicated bus 17 can be the system bus 15 if drop in performance caused by bus access conflict can be disregarded. The dedicated bus 17 may alternatively be two-way signal lines that are directly connected from one end to the other end.

The DMA controller 12 may have the same configuration as the DMA controller described in connection with FIG. 1. For the sake of convenience of explanation, the channels 22 are grouped into extension-purpose channels 22A and CPU-purpose channels 22B. The extension-purpose channels 22A are accessed and set by the DMAC control unit 31 according to the present invention. The CPU-purpose channels 22B are accessed and set by the CPU 11 in the same manner as in the conventional configuration. In this example, two extension-purpose channels 22A and one CPU-purpose channel 22B are illustrated. These numbers are non-limiting examples, and any number (one or more) of extension-purpose channels 22A and any number (one or more) of CPU-purpose channels 22B may be provided.

Similarly to the configuration shown in FIG. 1, the CPU 11 specifies a transfer source address, a transfer destination address, a transfer data size, the number of transfers, etc., for DMA, thereby making DMA transfer settings to the channel register 25 of the CPU-purpose channel 22B of the DMA controller 12. In response to what the settings indicate, the DMA control circuit 24 of the CPU-purpose channel 22B of the DMA controller 12 performs the specified DMA transfer.

The DMAC control unit 31 according to the present invention includes a plurality of virtual channels 32, a virtual channel arbiter 33, a DMA setting circuit 34, and a write-back circuit 35. Settings to the virtual channels 32 are made by the CPU 11 via the system bus 15. The virtual channel arbiter 33 performs arbitration with respect to the plurality of virtual channels 32 that are requesting DMA transfer, thereby selecting one virtual channel 32. The DMA setting circuit 34 makes settings to the channel register 25 of an extension-purpose channel of the DMA controller 12 via the dedicated bus 17 where these settings are the settings of the virtual channel 32 selected by the virtual channel arbiter 33. The write-back circuit 35 receives an interruption signal from the extension-purpose channel of the DMA controller 12 that has completed the DMA process, and performs a write-back with respect to the virtual channel 32.

Figure 4B:
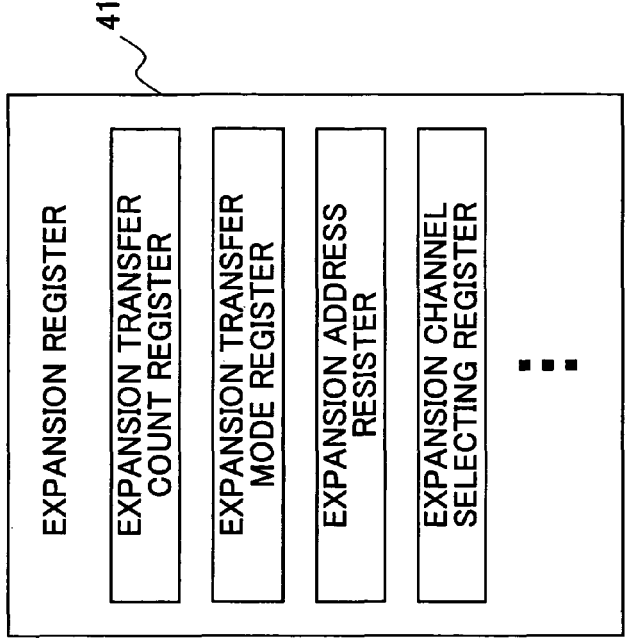
FIGS. 4A and 4B are drawings showing the register configuration of a virtual channel.
Figure 4A:
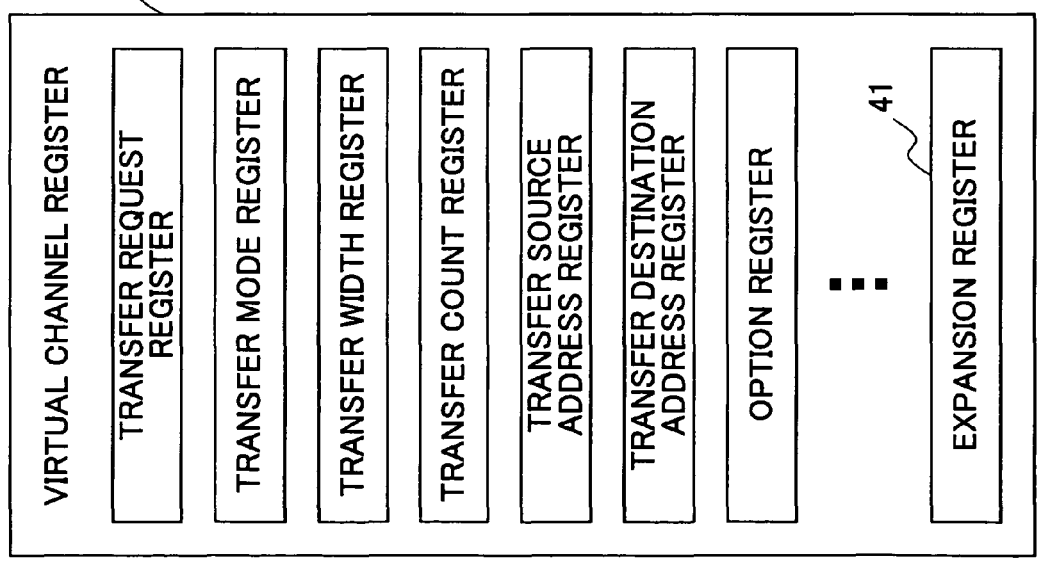

FIGS. 4A and 4B are drawings showing the register configuration of a virtual channel 32. One virtual channel 32 includes a virtual channel register 40 shown in FIG. 4A. The virtual channel register 40 includes registers such as a transfer request register, a transfer mode register, a transfer width register, a transfer count register, a transfer source address register, a transfer destination address register, an option register, and an expansion register 41. Except for the expansion register 41, the configuration is the same as that of the channel register 25 of the related-art DMA controller 12. The transfer request register stores a setting indicative of the presence/absence of a transfer request. The transfer mode register stores a setting indicative of the type of transfer such as a single transfer or a burst transfer. The transfer width register stores a setting indicative of the width of transfer such as a byte/half word/word. The transfer count register stores a setting indicative of the number of data transfers performed by use of the above-noted transfer mode and transfer width. The transfer source address register stores a setting indicative of the address in memory from which data is to be read. The transfer destination address register stores a setting indicative of the address in memory to which data is to be written. The option register stores settings relating to transfer options that are not necessarily required for DMA transfer. Such settings includes a temporal pause, a forced suspension, the reloading of an address or the number of transfers upon the completion of transfer, the selection of the presence/absence of an interruption signal, etc. The CPU 11 makes these settings via the system bus 15.

The configuration of the expansion register 41 is shown in FIG. 4B. The expansion register 41 includes an expansion transfer count register, an expansion transfer mode register, an expansion address resister, an expansion channel selecting register, etc. These registers of the expansion register 41 serve to store settings that cannot be made with respect to the channel register 25 of the DMA controller 12. The configuration of the expansion register 41 differs depending on what expanded transfer functions are provided in the DMAC control unit 31.

If the expansion register 41 is not used, the DMA controller 12 and the DMAC control unit 31 appear to have the same interface when viewed from the CPU 11. Only when the expanded functions provided by the DMAC control unit 31 are utilized, the expansion register 41 is used.

For example, if the transfer count register of a channel register 25 in the DMA controller 12 is comprised of 16 bits, 65,536 transfers can be performed at the maximum upon the making of a single setting. In this case, if the DMAC control unit 31 has a 4-bit register as an expansion transfer count register, this expansion transfer count register may be utilized to perform DMA transfers by use of the DMA controller 12 under the control of the DMAC control unit 31, thereby performing 1,048,576 transfers upon the making of a single setting. With this provision, the number of interruptions to the CPU 11 can be reduced to 1/16 as many. If the DMA controller 12 is not provided with a chain transfer function, a chain transfer setting may be made to the expansion transfer mode register of an expansion register 41 in the DMAC control unit 31. This makes it possible to perform pseudo chain transfer. In this case, since a plurality of transfer source addresses or transfer destination addresses are necessary, the expansion address register is used for this purpose. The chain transfer will later be described in detail.

The virtual channel arbiter 33 ceaselessly checks the transfer request register of each of the virtual channels 32. When there is a transfer request, a virtual channel 32 that is going to perform the DMA transfer is selected according to a predetermined priority system from the plurality of virtual channels 32 that are requesting transfer. The virtual channel arbiter 33 notifies the DMA setting circuit 34 of the register settings of the selected virtual channel 32. The DMA setting circuit 34 becomes the bus master of the dedicated bus 17 (or system bus 15 if the system bus 15 is used instead), and makes DMA transfer settings to the channel register 25 of an extension-purpose channel 22A of the DMA controller 12 in accordance with the register settings of the selected virtual channel 32.

The interruption signals of the extension-purpose channels 22A of the DMA controller 12 controlled by the DMAC control unit 31 are coupled to the write-back circuit 35 of the DMAC control unit 31. Upon the completion of a DMA transfer by an extension-purpose channel, an interruption signal is output for transmission to the write-back circuit 35. In response to the interruption signal, the write-back circuit 35 checks with the virtual channel arbiter 33 as to which one of the virtual channels 32 has been selected. The write-back circuit 35 then writes predetermined information obtained from the completed extension-purpose channel register to the selected virtual channel 32 (write-back). Further, the write-back circuit 35 enables an interruption signal bit of the selected virtual channel 32 in response to the interruption signal. An interruption signal responsive to this interruption signal bit is supplied to the CPU 11.

The above description has been provided with respect to an example in which the virtual channel arbiter 33 selects one of the virtual channels 32 with transfer requests according to a predetermined priority system, and the DMA setting circuit 34 makes DMA transfer settings to the channel register 25 of an extension-purpose channel 22A in the DMA controller 12 in accordance with the register settings of the selected virtual channel 32. In reality, however, such a scenario requires that only one extension-purpose channel 22A be provided in the DMA controller 12, or that an extension-purpose channel be selected in advance from a plurality of extension-purpose channels 22A as the channel for which settings are to be made. Otherwise, there is a need for the DMA setting circuit 34 to determine which one of the extension-purpose channels 22A is going to receive the DMA transfer settings.

FIG. 5 is a drawing showing an example of the configuration in which the DMA setting circuit 34 makes DMA transfer settings when a plurality of extension-purpose channels 22A are provided in the DMA controller 12. In the example shown in FIG. 5, three extension-purpose channels 22A-1 through 22A-3 are provided in the DMA controller 12. In conformity with this, the DMA setting circuit 34 includes setting circuits 53-1 through 53-3, and the virtual channel arbiter 33 includes transfer channel selecting circuits 51-1 through 51-3.

In the example shown in FIG. 5, six virtual channels 32-1 through 32-6 are provided. The virtual channels 32-1 and 32-2 are assigned in advance to the transfer channel selecting circuit 51-1. The virtual channels 32-3 and 32-5 are assigned in advance to the transfer channel selecting circuit 51-2, and the virtual channels 32-4 and 32-6 are assigned in advance to the transfer channel selecting circuit 51-3.

The transfer channel selecting circuit 51-1 selects one of the virtual channels 32-1 and 32-2 in response to transfer requests therefrom. The register settings of the selected virtual channel are supplied to the setting circuit 53-1. The setting circuit 53-1 stores the register settings of the selected virtual channel in the channel register 25 of the extension-purpose channel 22A-1 via the dedicated bus 17. The transfer channel selecting circuit 51-2 selects one of the virtual channels 32-3 and 32-5 in response to transfer requests therefrom. The register settings of the selected virtual channel are supplied to the setting circuit 53-2. The setting circuit 53-2 stores the register settings of the selected virtual channel in the channel register 25 of the extension-purpose channel 22A-2 via the dedicated bus 17. The transfer channel selecting circuit 51-3 selects one of the virtual channels 32-4 and 32-6 in response to transfer requests therefrom. The register settings of the selected virtual channel are supplied to the setting circuit 53-3. The setting circuit 53-3 stores the register settings of the selected virtual channel in the channel register 25 of the extension-purpose channel 22A-3 via the dedicated bus 17.

In this manner, the virtual channels 32-1 through 32-6 are grouped into groups assigned in advance in one-to-one correspondence to the extension-purpose channels 22A-1 through 22A-3. The virtual channel arbiter 33 then performs arbitration among the virtual channels assigned to the same extension-purpose channel. Since plural sets of DMA transfer settings cannot be made simultaneously from the setting circuits 53-1 through 53-3, there is a need to select one of the setting circuits 53-1 through 53-3 according to priority. To this end, the DMA setting circuit 34 is provided with a selector 54. Once a DMA transfer starts, the DMA transfer comes to an end only on a channel-by-channel basis. DMA transfer settings can thus be performed on a channel-by-channel basis. Accordingly, it suffices to use a simple priority system such as the rotating priority system with respect to the setting circuits 53-1 through 53-3.

Information indicative of which virtual channel corresponds to which extension-purpose register is centrally managed by use of a channel assignment register 52 provided in the virtual channel arbiter 33. The channel assignment register 52 stores information indicative of which one of the virtual channels 32-1 through 32-6 is assigned to which one of the transfer channel selecting circuits 51-1 through 51-3, thereby making it possible to dynamically modify the grouping of virtual channels.

With the configuration shown in FIG. 5, it is possible to control the priority of extended-purpose channels provided in the DMA controller 12 according to the priority settings assigned to the groups, and also to assign priority to each of the virtual channels within each group independently of the other groups. This achieves a diligent priority system with relative ease.

FIG. 6 is a flowchart of a DMA transfer process performed by the DMA transfer system shown in FIG. 3. At step S1, the virtual channel arbiter 33 of the DMAC control unit 31 monitors the presence/absence of a transfer request from the virtual channels 32. At step S2, the virtual channel arbiter 33 selects a virtual channel 32 to perform a DMA transfer according to a predetermined priority system. At step S3, the DMA setting circuit 34 makes DMA transfer settings to an extension-purpose channel 22A of the DMA controller 12 via the dedicated bus 17 according to the register settings of the selected virtual channel 32.

At step S4, the DMA controller 12 performs a DMA transfer with respect to the extension-purpose channel 22A for which settings are made at step S3. At step S5, the write-back circuit 35 of the DMAC control unit 31 waits for a DMA transfer completion/error interruption supplied from the DMA controller 12. Upon a DMA transfer completion/error interruption, at step S6, the write-back circuit 35 checks the virtual channel arbiter 33 to find out the virtual channel (i.e., currently selected virtual channel) that has just completed the transfer.

At step S7, the write-back circuit 35 updates the contents of the virtual channel register 40 of the virtual channel 32 in response to the values of the channel register 25 of the extension-purpose channel 22A provided in the DMA controller 12. At step S8, the write-back circuit 35 refers to the values of the virtual channel register 40 to check whether all the DMA transfer has been completed. If there is a DMA transfer process that has yet to be completed, the procedure goes back to step S1 to repeat the processes described above.

If all the DMA transfer has been completed, at step S9, the write-back circuit 35 performs processes associated with a termination such as enabling a completion/error interruption signal of the virtual channel 32, preparing for a next transfer by reading the expanded settings, etc. With this, the DMA transfer procedure comes to an end.

Figure 7:
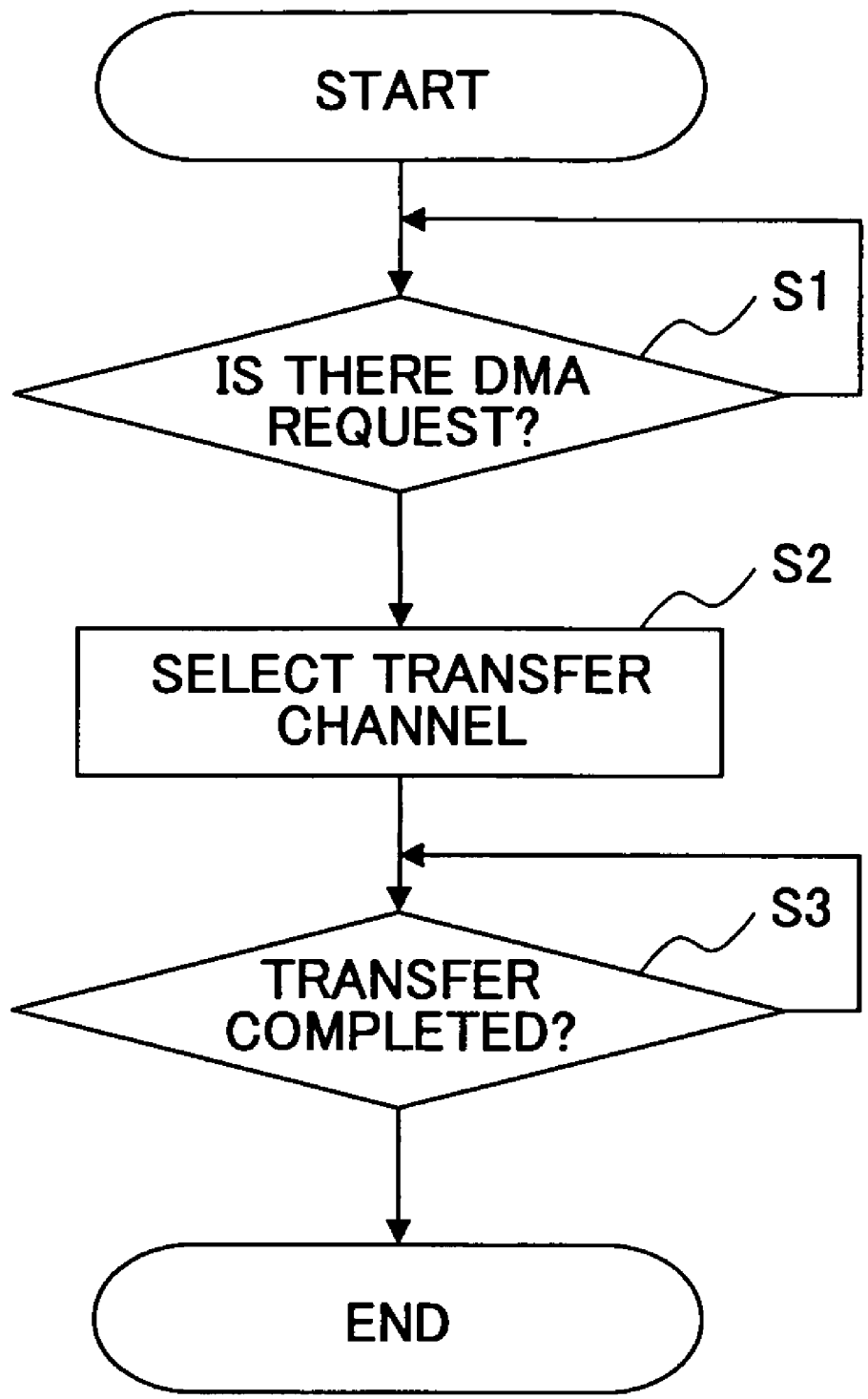
FIG. 7 is a flowchart of a process of selecting a virtual channel register for which a DMA transfer is to be performed.

FIG. 7 is a flowchart of a process of selecting a virtual channel register for which a DMA transfer is to be performed. At step S1, the virtual channel arbiter 33 checks whether any one of the virtual channels 32 is requesting transfer. At step S2, the virtual channel arbiter 33 selects a virtual channel 32 to perform a DMA transfer according to a priority selection system determined in advance. At step S3, the virtual channel arbiter 33 waits for the withdrawal of a transfer request from the selected virtual channel 32. When the transfer request is withdrawn at step S3, the selection process comes to an end. Then, a new selection process starts at step S1 to select a next transfer channel.

According to the DMA transfer system 30 of the present invention described above, the number of channels available in the system is equal to the number of virtual channels 32 implemented in the DMAC control unit 31. It follows that the number of channels can be easily increased by adjusting the number of virtual channels 32. In this case, since it suffices for the DMA controller 12 to have the same configuration as that of a conventional DMA controller, it is easy to increase the number of channels.

If a plurality of DMA controllers 12 is provided to increase the number of channels, the circuit size increases by an amount commensurate with the increase in the number of DMA controllers 12. On the other hand, if the number of channels is increased by use of the DMAC control unit 31, the circuit size increases only by an amount corresponding to the size of the registers for holding channel settings. An increase in circuit size associated with an increase in the number of channels can thus be kept to a minimum.

Figure 2:
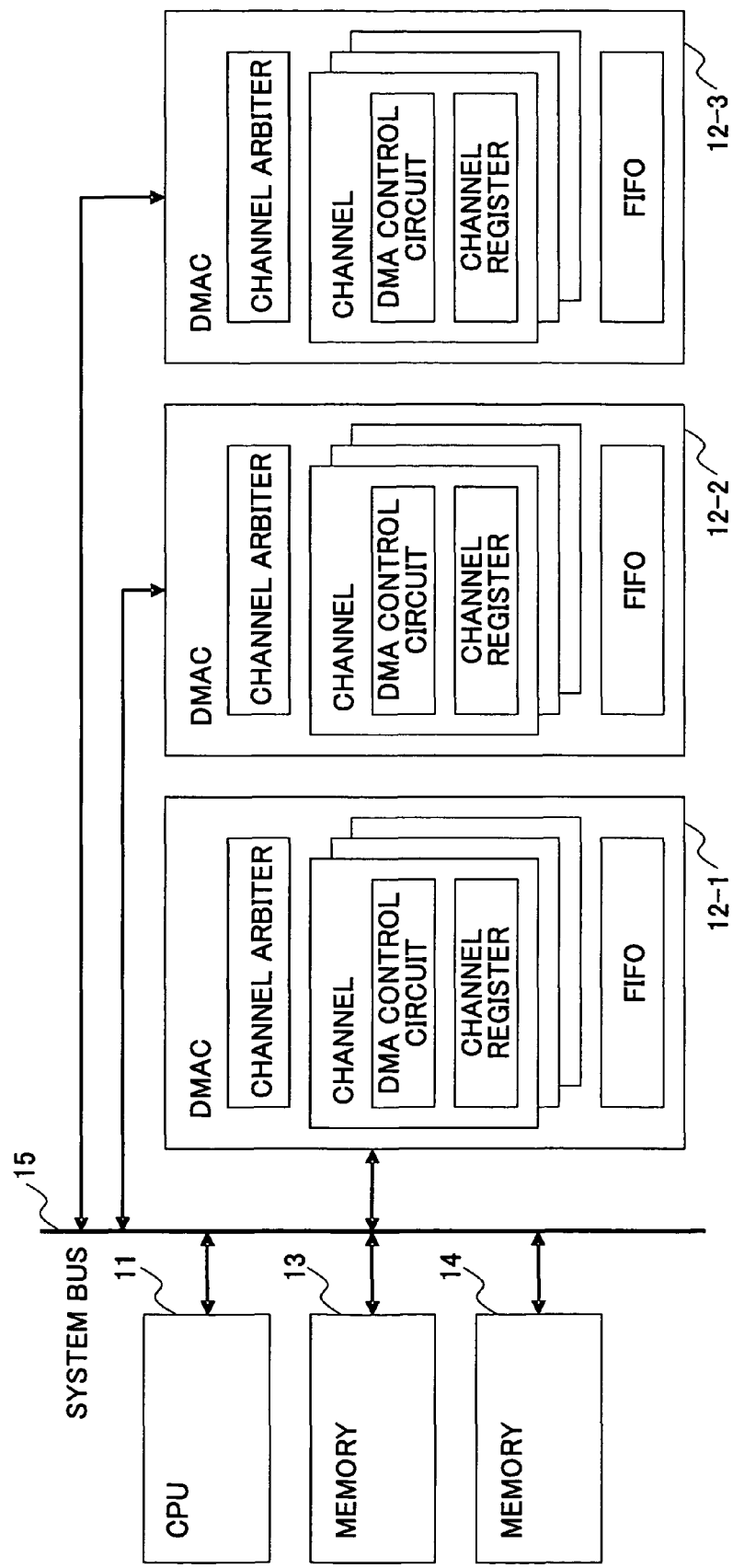
FIG. 2 is a drawing showing a system configuration in which a plurality of DMA controllers are provided.

Further, if the number of channels is increased by providing a plurality of DMA controllers 12 as shown in FIG. 2, the DMA controllers 12 end up competing against each other in an attempt to take the system bus, resulting in drop in transfer performance. In the case of the configuration shown in FIG. 3, on the other hand, the DMAC control unit 31 centrally manages the priority of all the virtual channels to control the DMA controller 12. Drop in performance can thus be avoided.

Figure 8:
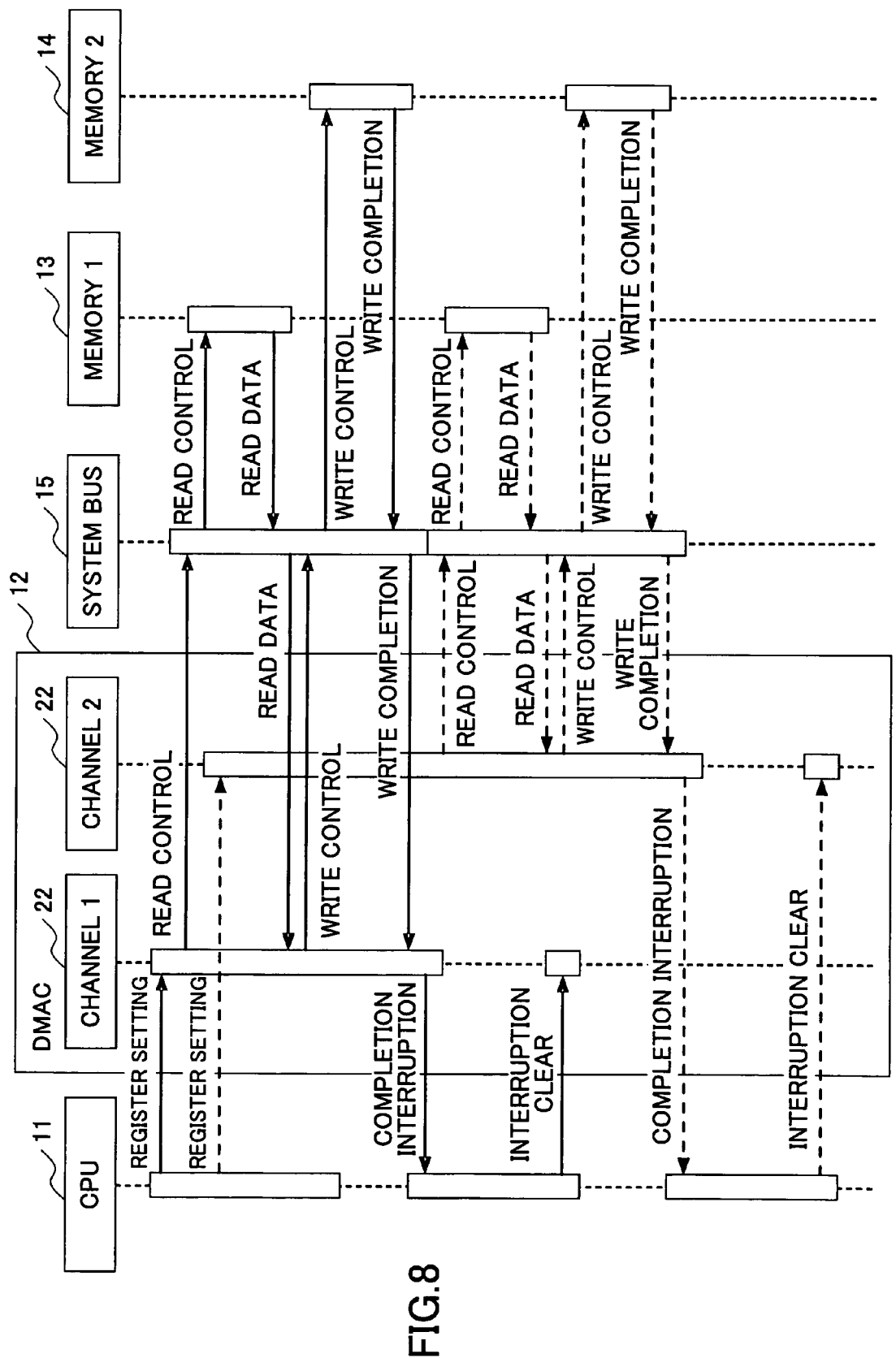
FIG. 8 is a sequence chart showing a DMA transfer process performed by the related-art DMA transfer system shown in FIG. 1.
Figure 9:
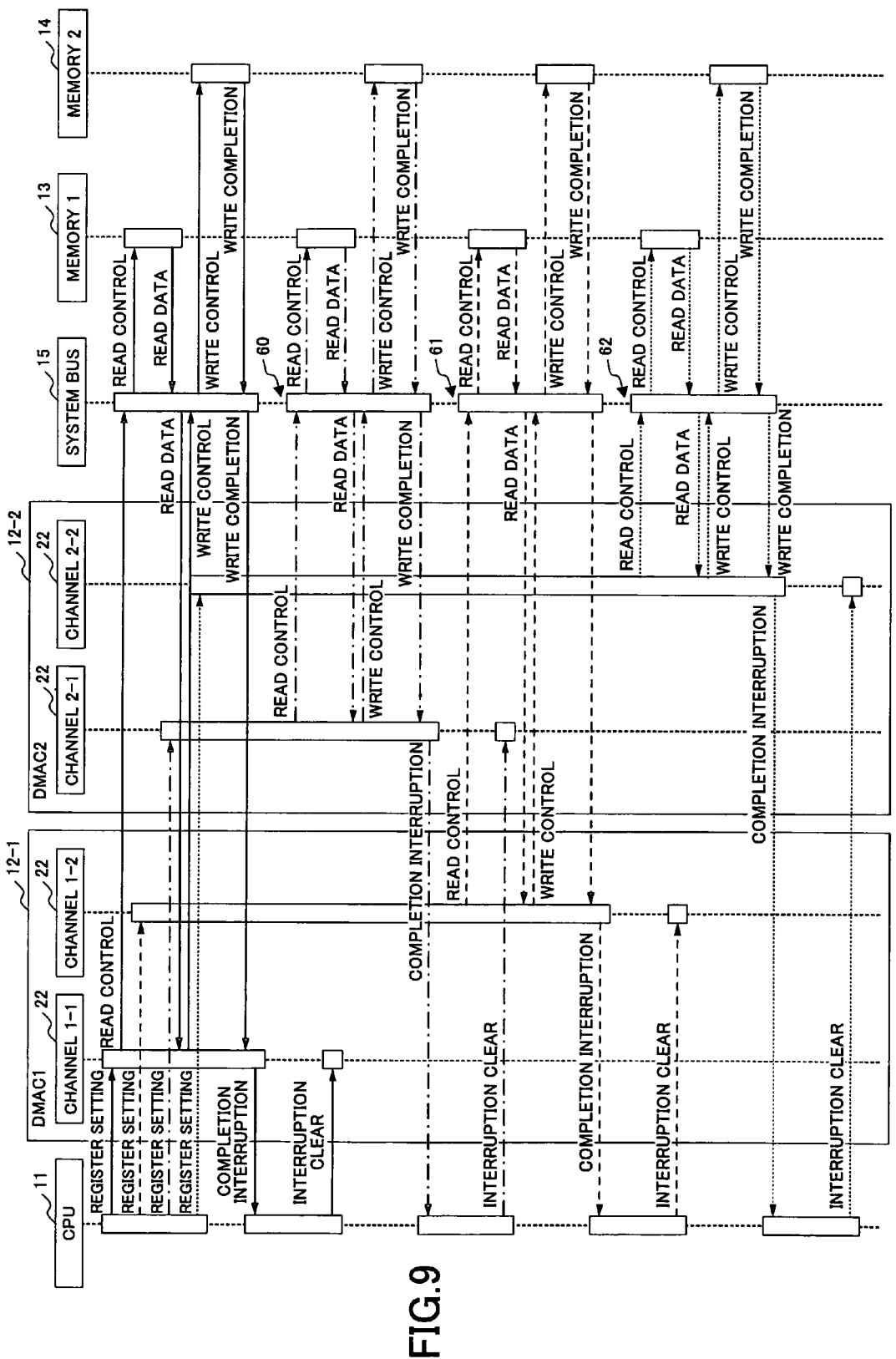
FIG. 9 is a sequence chart showing a DMA transfer process performed by the related-art DMA transfer system shown in FIG. 2.
Figure 10:
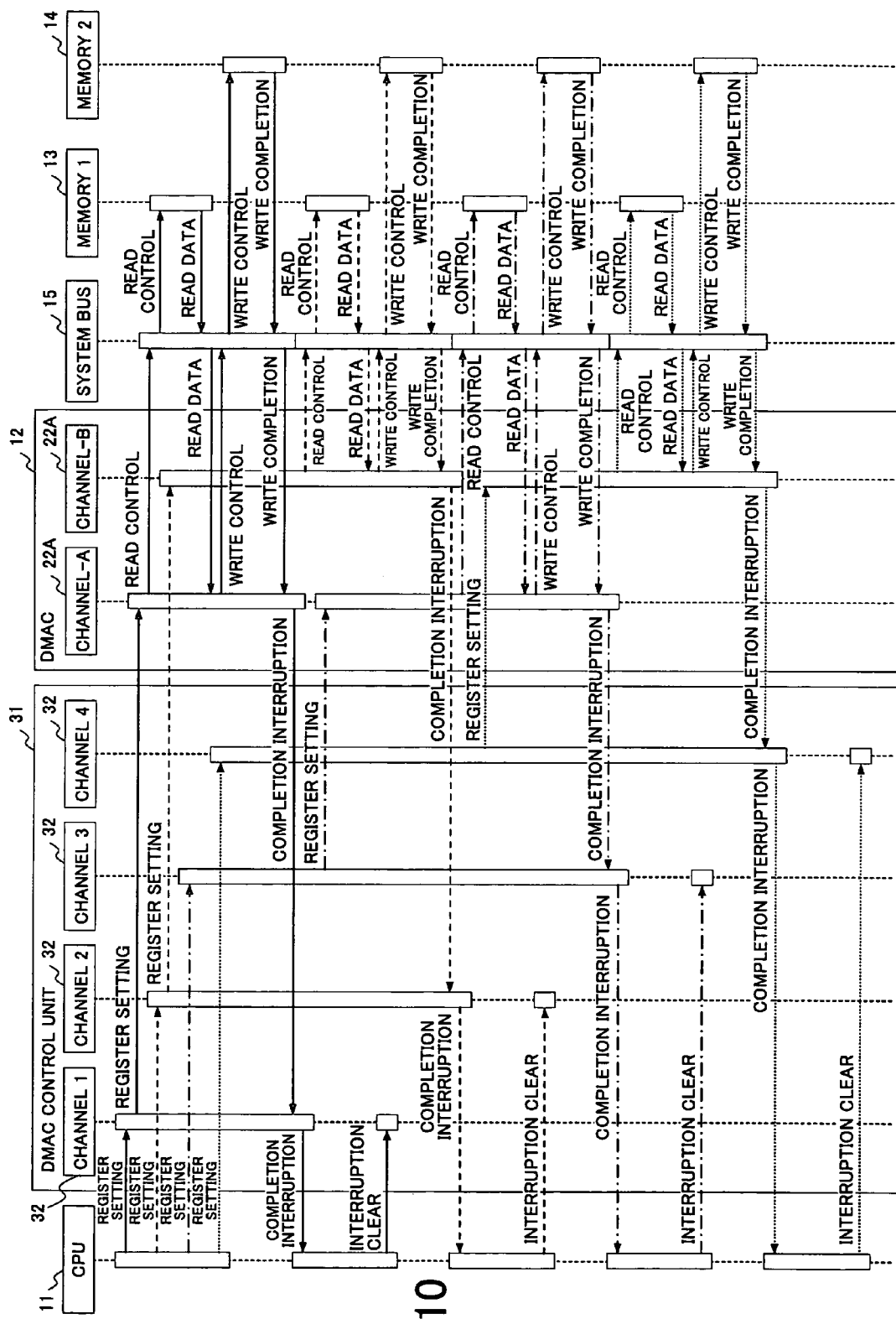
FIG. 10 is a sequence chart showing a DMA transfer process performed by the DMA transfer system of the present invention shown in FIG. 3.

FIG. 8 is a sequence chart showing a DMA transfer process performed by the related-art DMA transfer system 10 shown in FIG. 1. FIG. 9 is a sequence chart showing a DMA transfer process performed by the related-art DMA transfer system 10 shown in FIG. 2. FIG. 10 is a sequence chart showing a DMA transfer process performed by the DMA transfer system 30 of the present invention shown in FIG. 3.

In FIG. 8 through FIG. 10, "REGISTER SETTING" refers to an operation by the CPU making settings to channel registers. "READ CONTROL" refers to a sequence of read access operations performed by the DMA controller 12 with respect to a memory. "READ DATA" refers to an operation that transfers data read in response to a read access. "WRITE CONTROL" refers to a sequence of write access operations performed by the DMA controller 12 with respect to a memory. "WRITE COMPLETION" refers to an operation that notifies of a write completion in response to a write access. "COMPLETION INTERRUPTION" refers to an interruption signal indicative of the completion of DMA transfer that is transmitted from the DMA controller 12 or the DMAC control unit 31 to the CPU 11. "INTERRUPTION CLEAR" refers to an operation by the CPU 11 clearing (resetting) the interruption signal in response to "COMPLETION INTERRUPTION".

In a DMA transfer operation shown in FIG. 8 by the related-art DMA transfer system 10 of FIG. 1, the CPU 11 makes register settings with respect to two channels 22 of the DMA controller 12. As actual DMA transfer operations, a DMA transfer for Channel1 that is one of the channels 22 is performed first, and, then, a DMA transfer for Channel2 that is the other one of the channels 22 is performed. If the number of channels provided in the DMA controller 12 is two, and if there is a need to perform three or more DMA transfers, the entire process shown in FIG. 8 including the register setting by the CPU 11 needs to be performed repeatedly. In this case, a heavy load is placed on the CPU 11.

In the example of a DMA transfer operation shown in FIG. 9 by the related-art DMA transfer system of FIG. 2, the two DMA controllers 12-1 and 12-2 are utilized. The CPU 11 first performs register settings with respect to two channels 22 of the DMA controller 12-1, and then performs register settings with respect to two channels 22 of the DMA controller 12-2. As actual DMA transfer operations, a DMA transfer for Channel1-1 that is one of the channels 22 provided in the DMA controller 12-1 is performed first, and, then, a DMA transfer for Channel2-1 that is one of the channels 22 provided in the DMA controller 12-2 is performed. In so doing, after the completion of the DMA transfer in respect of Channel1-1, the DMA controller 12-1 and the DMA controller 12-2 compete against each other in attempt to obtain the bus-access right, which results in a time loss 60. After the completion of the DMA transfer in respect of Channel2-1, a DMA transfer is performed with respect to Channel1-2 that is one of the channels 22 provided in the DMA controller 12-1. In so doing, after the completion of the DMA transfer in respect of Channel2-1, the DMA controller 12-1 and the DMA controller 12-2 compete against each other in attempt to obtain the bus-access right, which results in a time loss 61. Further, a time loss 62 occurs after the DMA transfer in respect of Channel1-2.

With the configuration having a plurality of DMA controllers as described above, the competition to take the system bus 15 always occurs each time a DMA transfer comes to an end. Because of this, a time loss is created between DMA transfers, resulting in drop in performance.

In a DMA transfer operation shown in FIG. 10 by the DMA transfer system 30 of FIG. 3, the CPU 11 makes register settings with respect to four virtual channels 32 of the DMAC control unit 31. Although the number of channels 22A used in the DMA controller 12 is two, the CPU 11 can finish register settings at once with respect to four DMA transfer operations because there are four virtual channels 32 provided in the DMAC control unit 31.

The DMAC control unit 31 writes the register settings of Channel1 that is one of the virtual channels 32 to Channel-A that is one of the channels 22A provided in the DMA controller 12. With this arrangement, the DMA operation for Channel-A is performed first. Concurrently with this, the DMAC control unit 31 writes the register settings of Channel2 that is one of the virtual channels 32 to Channel-B that is one of the channels 22A provided in the DMA controller 12. Accordingly, when the DMA process for Channel-A comes to an end, a DMA process is immediately performed with respect to Channel-B.

Concurrently with the DMA process for Channel-B, the DMAC control unit 31 writes the register settings of Channel3 that is one of the virtual channels 32 to Channel-A that is one of the channels 22A provided in the DMA controller 12. Accordingly, when the DMA process for Channel-B comes to an end, a DMA process is immediately performed with respect to Channel-A. Concurrently with this, the DMAC control unit 31 writes the register settings of Channel4 that is one of the virtual channels 32 to Channel-B that is one of the channels 22A provided in the DMA controller 12. Accordingly, when the DMA process for Channel-A comes to an end, a DMA process is immediately performed with respect to Channel-B.

In the DMA transfer process by the DMA transfer system 30 of the present invention shown in FIG. 10, DMA transfers can be consecutively performed for four channels without using the CPU 11 despite the fact that only two extension-purpose channels 22A are provided in the DMA controller 12. Since there is no competition to take the system bus 15, unlike the case shown in FIG. 9, there is no time loss between DMA transfers.

If a plurality of DMA controllers are used as shown in FIG. 9, channels are distributed across the plurality of DMA controllers 12, which makes it difficult to perform a accurate priority control with respect to these channels. If the DMAC control unit 31 is used as shown in FIG. 10, on the other hand, the DMAC control unit 31 centrally controls the priority of the channels, which makes it possible to perform DMA transfer while maintaining the priority levels exactly as intended.

Figure 11:
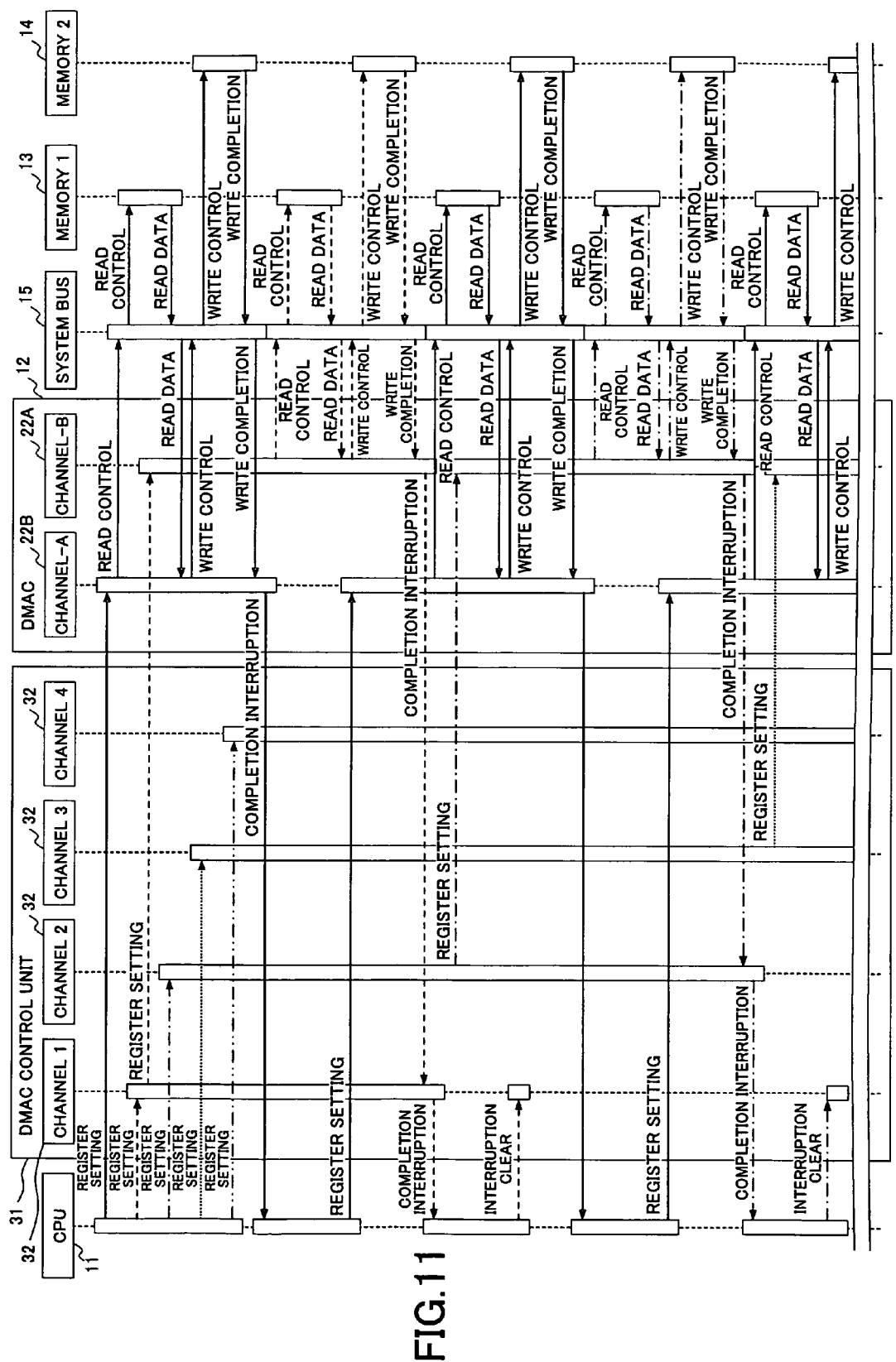
FIG. 11 is a drawing showing a DMA transfer process performed when a DMA setting from a CPU to the DMA controller and a DMA setting from a DMAC control unit to the DMA controller are both performed in the DMA transfer system shown in FIG. 3.

In the DMA transfer process performed by the DMA transfer system 30 of the present invention, further, the CPU 11 can directly make DMA settings to the DMA controller 12 as in the conventional system without using the DMAC control unit 31. FIG. 11 is a drawing showing a DMA transfer process performed when a DMA setting from the CPU to the DMA controller 12 and a DMA setting from the DMAC control unit 31 to the DMA controller 12 are both performed in the DMA transfer system 30 shown in FIG. 3.

In the DMA transfer process shown in FIG. 11, Channel-A of the DMA controller 12 is used as a CPU-purpose channel 22B, and Channel-B is used as an extension-purpose channel 22A. As shown in FIG. 11, the CPU 11 directly makes register settings with respect to the CPU-purpose channel 22B of the DMA controller 12, and makes register settings via the DMAC control unit 31 with respect to the extension-purpose channel 22A. In this configuration, the CPU 11 can make DMA transfer settings directly to a CPU-purpose channel of the DMA controller 12 so as to perform transfer. In such a case, the DMAC control unit 31 is not used as an intervening element, so that response to instruction from the CPU 11 can be quick. This configuration is thus effective when there is a desire to shorten a time length from a transfer instruction to the start of the transfer, such as when the transfer requires urgency.

The CPU 11 performs register settings with respect to the CPU-purpose channel 22B of the DMA controller 12 each time a DMA transfer comes to an end. With respect to the extension-purpose channel 22A of the DMA controller 12, on the other hand, the DMAC control unit 31 is employed, so that it suffices for the CPU 11 to make register settings all at once at the beginning with respect to the plurality of virtual channels 32 of the DMAC control unit 31. After this, the DMAC control unit 31 performs register settings with respect to the extension-purpose channel 22A of the DMA controller 12 at appropriate timing.

In the DMA transfer system 30 shown in FIG. 3, the expansion registers 41 of the virtual channels 32 may be utilized to accomplish sophisticated transfer functions. For example, the CPU 11 makes DMA transfer settings to the DMAC control unit 31 only once, and, then, the DMAC control unit 31 makes DMA transfer settings to the DMA controller 12 multiple times, thereby making it possible to perform sophisticated control with respect to the DMA controller 12.

In the following, a specific example will be given with reference to a case in which a chain transfer is performed in the DMA transfer system 30. The chain transfer serves to performs successive transfers from one or more transfer sources and to one or more transfer destinations. For example, transfer is performed as follows: 1) the header information of an image is written from the memory 13 to the memory 16; 2) the data information of the image is written from the memory 14 to the memory 16, and 3) the footer information of the image is written from the memory 13 to the memory 16. As a result of this transfer, image data in predetermined format is created in the memory 16. A transfer method that performs a series of transfers such as 1) through 3) described above upon the making of a single setting is referred to as a chain transfer method.

Figure 12:
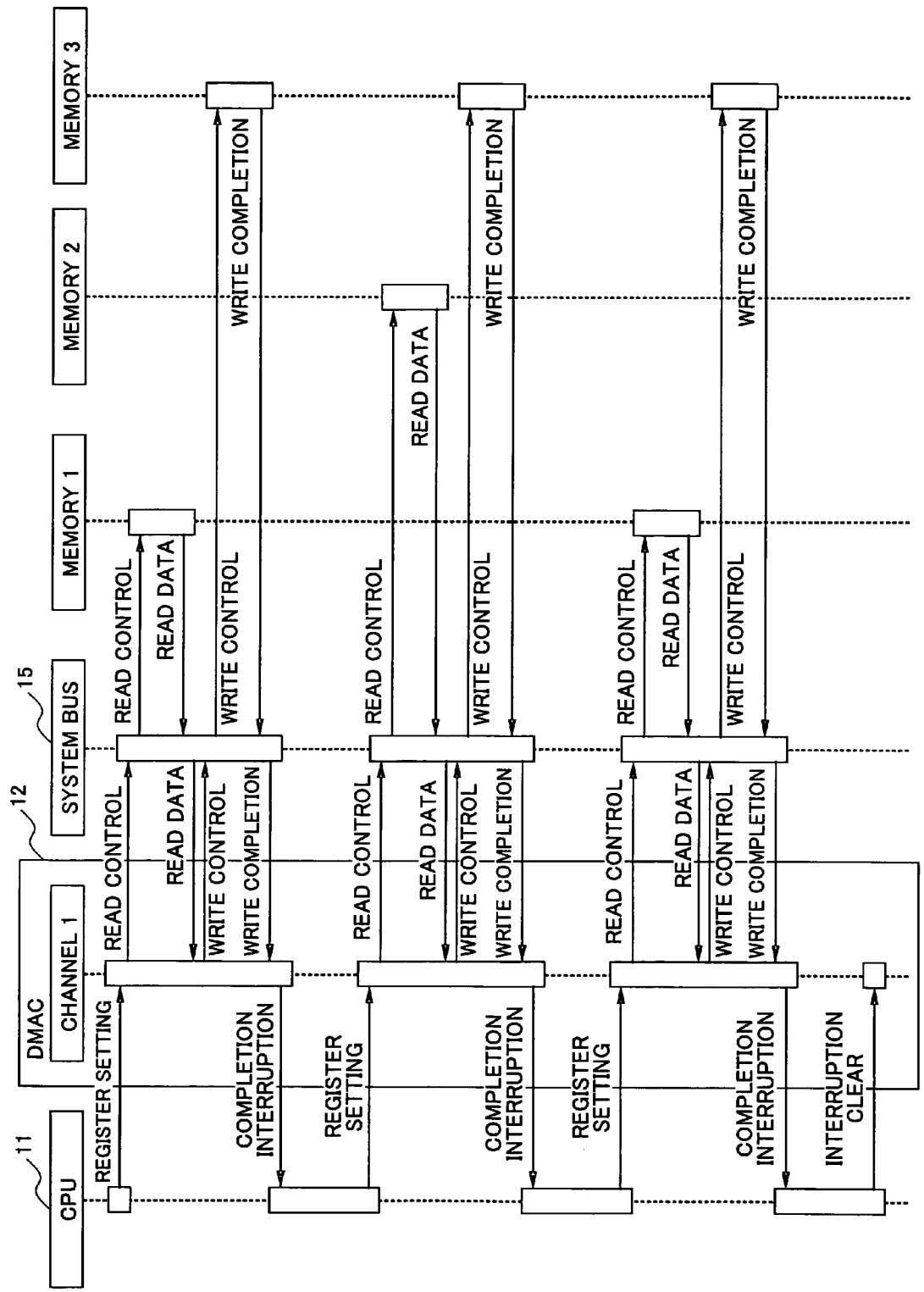
FIG. 12 is a drawing showing a DMA transfer performed when no chain transfer function is implemented in a configuration in which only the related-art DMA controller as shown in FIG. 1 is provided.

FIG. 12 is a drawing showing a DMA transfer performed when no chain transfer function is implemented in a configuration in which only the related-art DMA controller 12 as shown in FIG. 1 is provided. FIG. 12 illustrates a process that transfers data successively from two transfer source memories to one transfer destination memory as in 1) through 3) described above. As shown in FIG. 12, register settings from the CPU 11 to the DMA controller 12 paired with a DMA transfer process by the DMA controller 12 need to be performed separately for each transfer operation corresponding to each of 1) through 3) described above.

Figure 13:
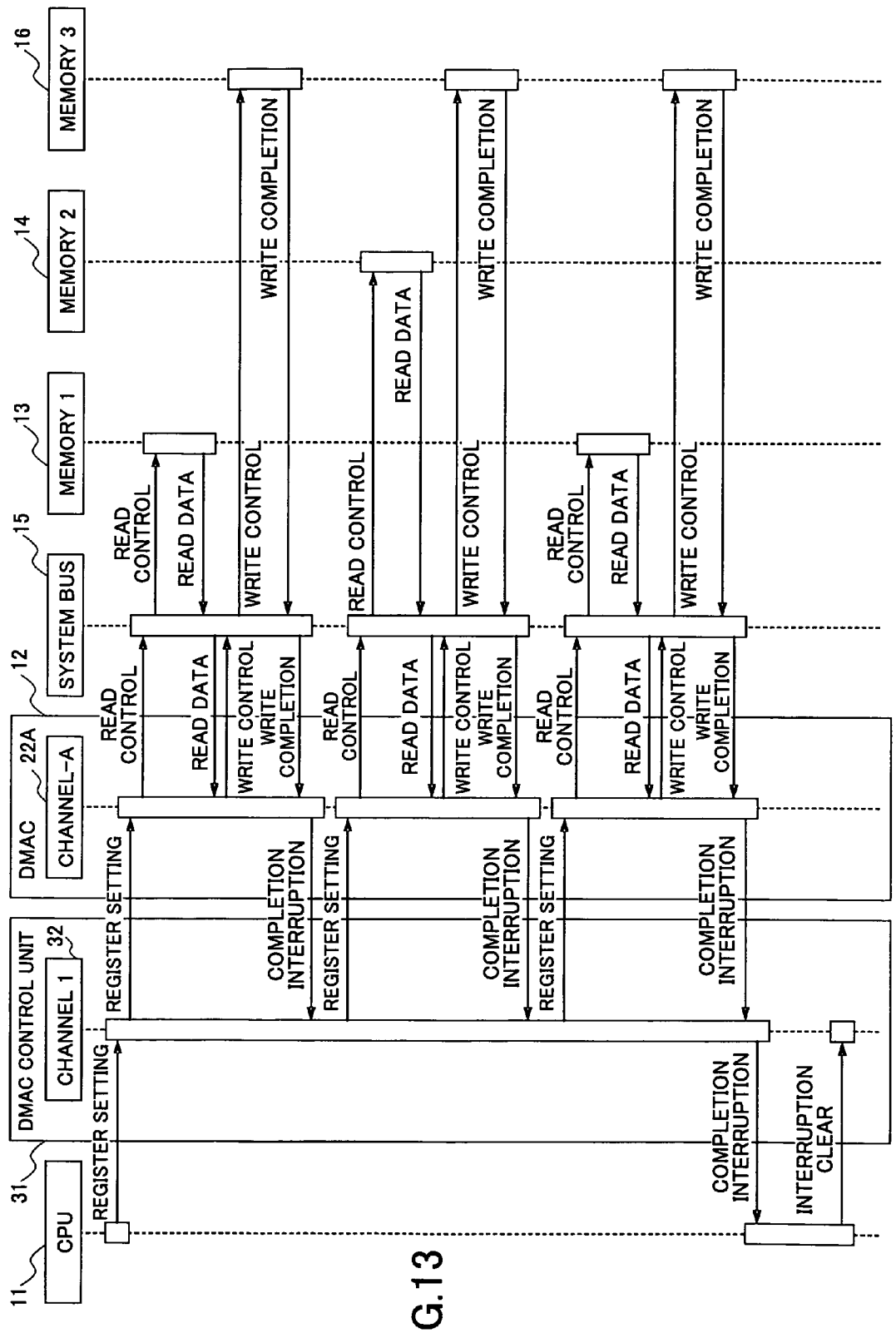
FIG. 13 is a drawing showing a DMA transfer process performed when a chain transfer function is implemented by use of the expansion register of the DMAC control unit in the DMA transfer system shown in FIG. 3.

FIG. 13 is a drawing showing a DMA transfer process performed when a chain transfer function is implemented by use of the expansion register 41 of the DMAC control unit 31 in the DMA transfer system 30 shown in FIG. 3. First, the CPU 11 makes register settings to Channel1 that is one of the virtual channels 32 provided in the DMAC control unit 31. In so doing, the address of the first transfer source (i.e., address in the memory 13) is set to the transfer source address register of the virtual channel register 40 of Channel1. In addition to the normal settings to the virtual channel register 40, further, a chain transfer setting is made to the expansion transfer mode register of the expansion register 41 of Channel1. Moreover, the address of the second transfer source (i.e., address in the memory 14) is set to the expansion address register of the expansion register 41.

As the chain transfer setting in the expansion transfer mode register of the expansion register 41 is detected, the DMAC control unit 31 makes register settings to an extension-purpose channel 22A of the DMA controller 12 so as to cause the DMA controller 12 to perform a DMA transfer from the memory 13 serving as the first transfer source to the memory 16. As this DMA transfer comes to an end, the DMAC control unit 31 makes next register settings to an extension-purpose channel 22A of the DMA controller 12 so as to cause the DMA controller 12 to perform a DMA transfer from the memory 14 serving as the second transfer source to the memory 16. As this DMA transfer comes to an end, finally, the DMAC control unit 31 makes register settings to an extension-purpose channel 22A of the DMA controller 12 so as to cause the DMA controller 12 to perform a DMA transfer from the memory 13 serving as the first transfer source to the memory 16.

In the DMA transfer system 30 of the present invention described above, the CPU 11 performs a DMA transfer setting only once with respect to the DMAC control unit 31, and, then, the DMAC control unit 31 performs DMA transfer settings multiple times with respect to the DMA controller 12, thereby performing a pseudo chain transfer. With this provision, the number of interruptions to the CPU 11 is decreased, thereby reducing the load on the CPU 11 and improving the transfer performance.

Figure 14:
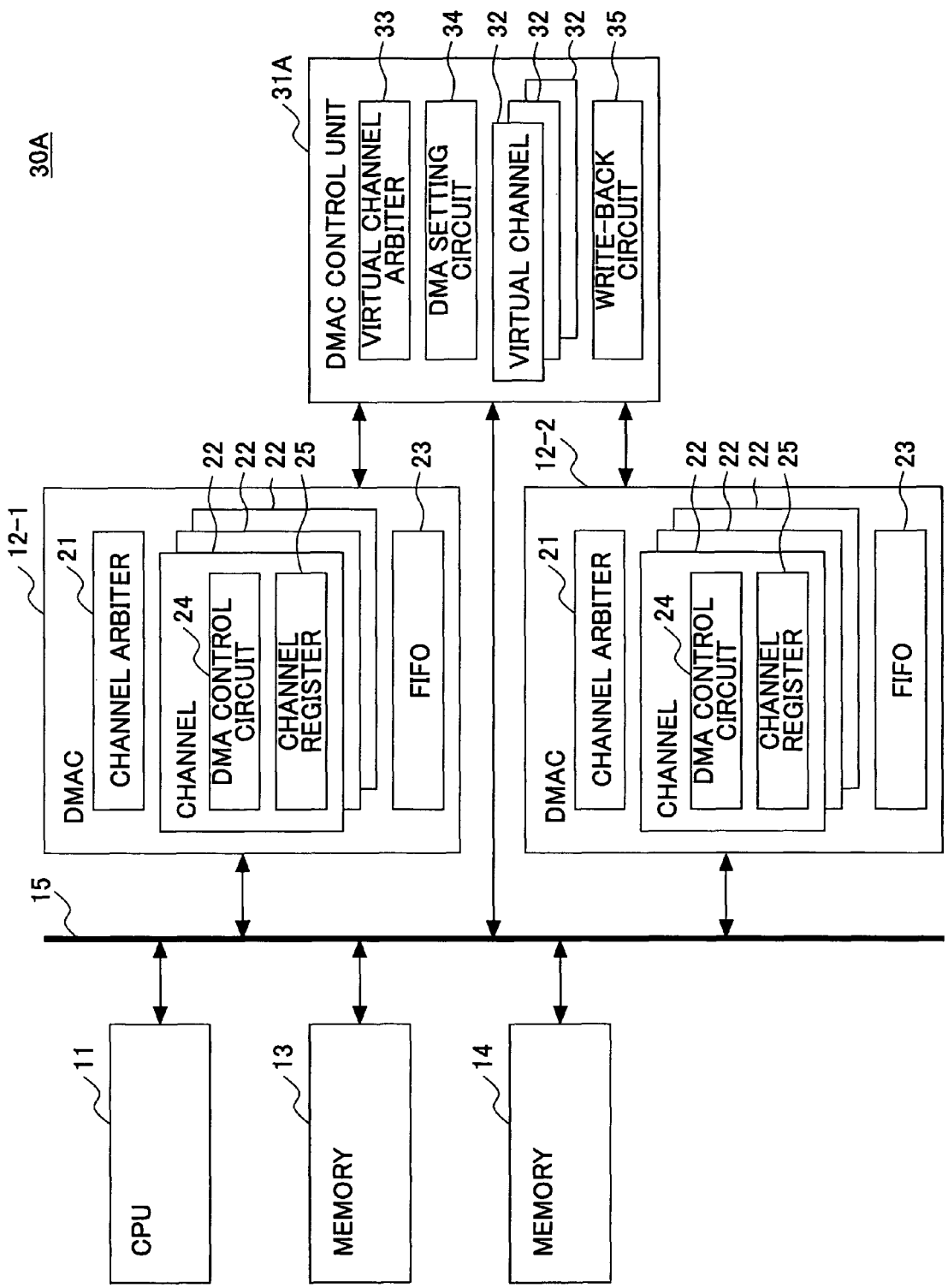
FIG. 14 is a block diagram showing the configuration of a variation of the DMA transfer system according to the present invention.

FIG. 14 is a block diagram showing the configuration of a variation of the DMA transfer system 30 according to the present invention. In FIG. 14, the same elements as those of FIG. 3 are referred to by the same numerals, and a description thereof will be omitted.

A DMA transfer system 30A shown in FIG. 14 includes two DMA controllers 12-1 and 12-2, and a DMAC control unit 31A controls these two DMA controllers 12-1 and 12-2. Each of the DMA controllers 12-1 and 12-2 has the same configuration as the DMA controller 12 shown in FIG. 3. The configuration of the DMAC control unit 31A may be the same as that of the DMAC control unit 31 shown in FIG. 3 if provision is made such that register settings can be made to a plurality of extension-purpose channels 22A as in the example shown in FIG. 5. Since only a single DMA transfer is performed at a time, the notification of a DMA transfer completion from the DMA controllers 12-1 and 12-2 to the write-back circuit 35 may be performed in the same manner as in the configuration of the DMAC control unit 31 shown in FIG. 3, in which notification is sent directly from the extension-purpose channels 22A to the write-back circuit 35.

In the configuration shown in FIG. 14, the DMA controller 12-1 may be a DMA controller provided with basic DMA transfer functions, and the DMA controller 12-2 may be a DMA controller provided with DMA transfer functions specialized for a particular type of transfer. With this provision, the DMAC control unit 31A can efficiently perform a special, complicated DMA transfer.

Figure 15:
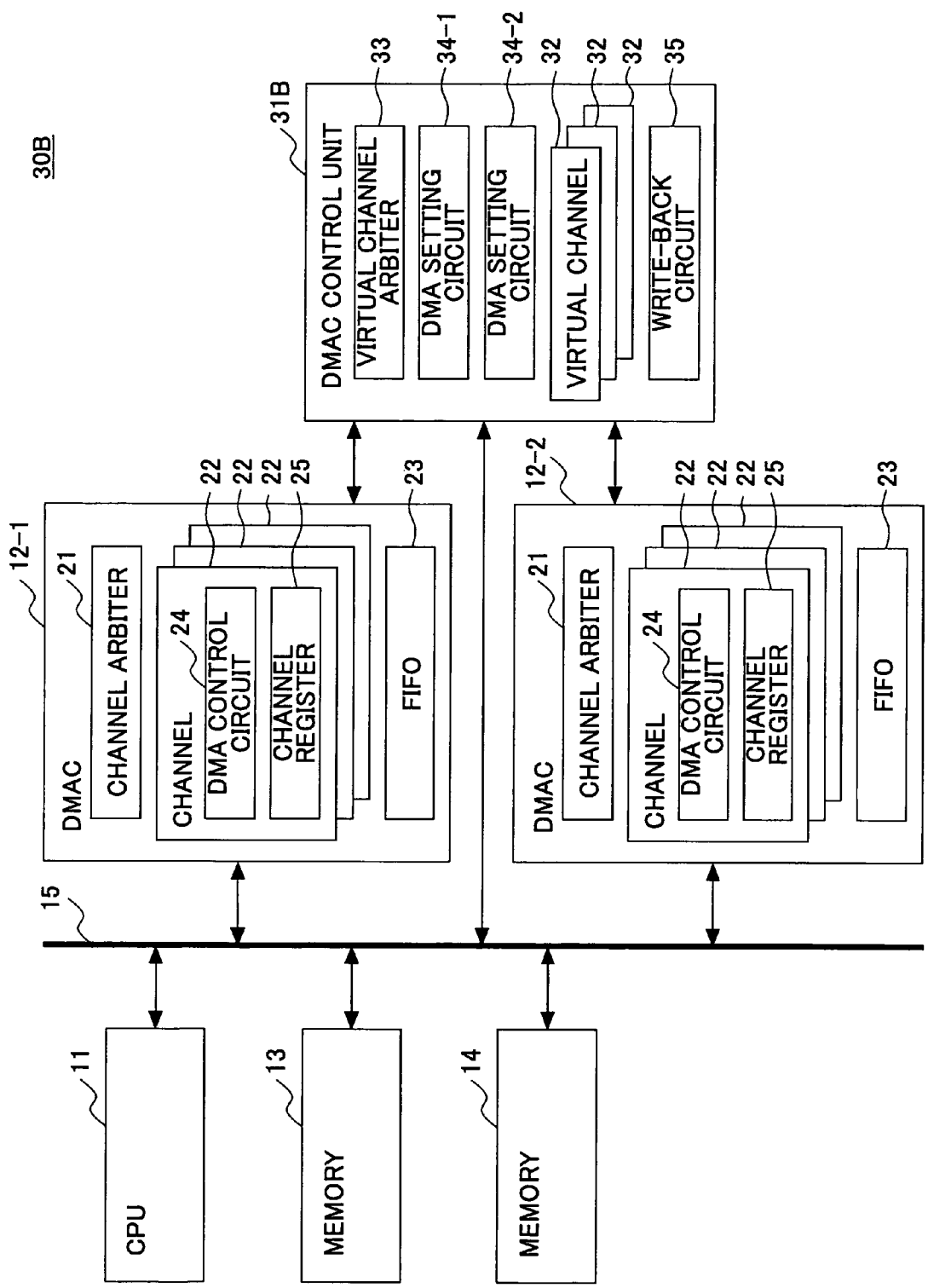
FIG. 15 is a block diagram showing the configuration of another variation of the DMA transfer system according to the present invention.

FIG. 15 is a block diagram showing the configuration of another variation of the DMA transfer system 30 according to the present invention. In FIG. 15, the same elements as those of FIG. 14 are referred to by the same numerals, and a description thereof will be omitted.

A DMA transfer system 30B shown in FIG. 15 includes two DMA controllers 12-1 and 12-2 as in the configuration shown in FIG. 14, and a DMAC control unit 31B controls these two DMA controllers 12-1 and 12-2. It should be noted that the DMAC control unit 31B includes a DMA setting circuit 34-1 for the DMA controller 12-1 and a DMA setting circuit 34-2 for the DMA controller 12-2 separately.

Figure 16:
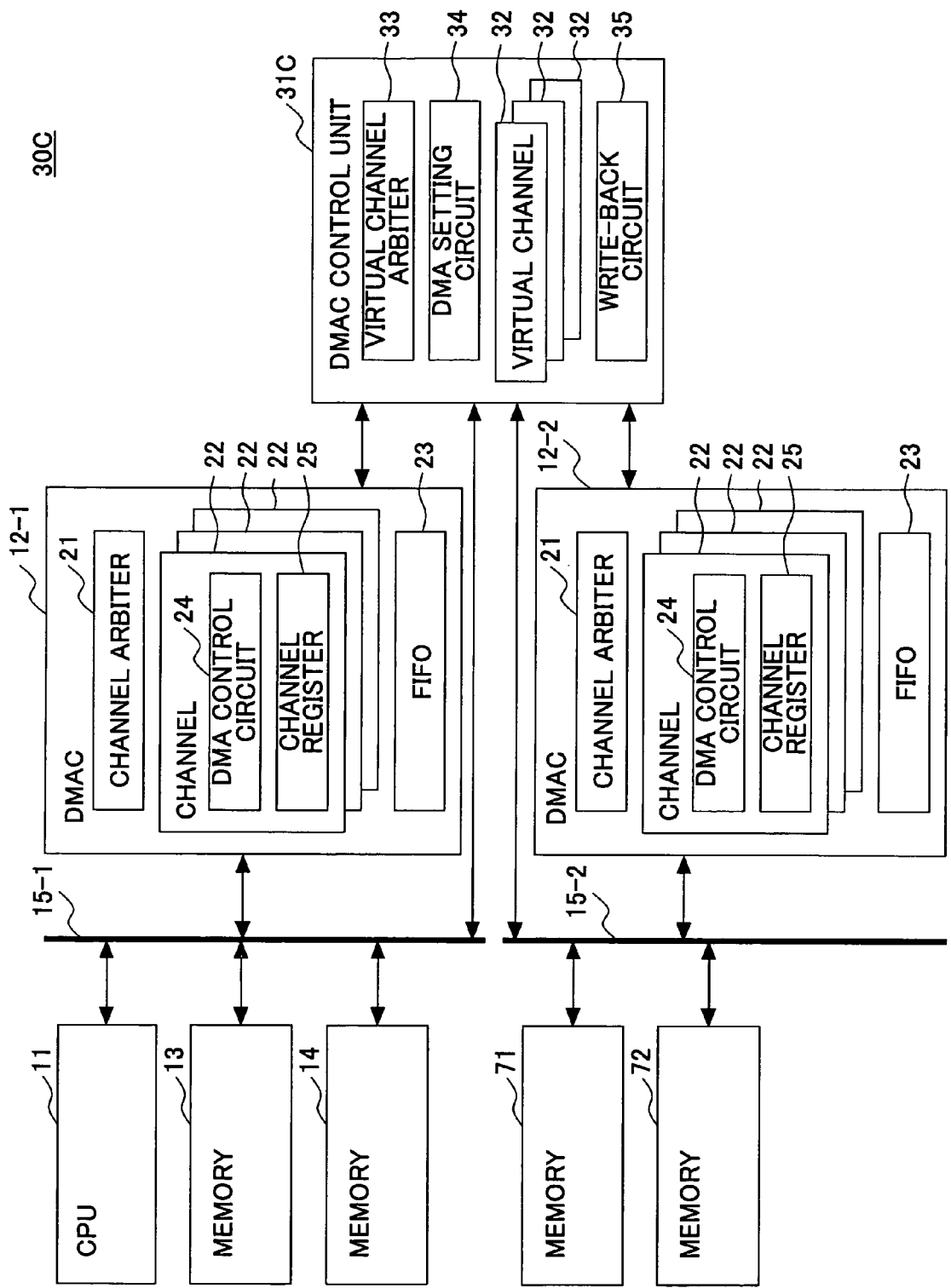
FIG. 16 is a block diagram showing the configuration of another variation of the DMA transfer system according to the present invention.

FIG. 16 is a block diagram showing the configuration of another variation of the DMA transfer system 30 according to the present invention. In FIG. 16, the same elements as those of FIG. 14 are referred to by the same numerals, and a description thereof will be omitted.

In the DMA transfer system 30C shown in FIG. 16, the system bus is divided into a system bus 15-1 and a system bus 15-2, with a DMAC control unit 31C coupling between the system bus 15-1 and the system bus 15-2. The CPU 11, the memory 13, the memory 14, the DMA controller 12-1, and the DMAC control unit 31C are connected to the system bus 15-1, and a memory 71, a memory 72, the DMA controller 12-2, and the DMAC control unit 31 are connected to the system bus 15-2.

With this provision, the DMAC control unit 31C performs DMAC control across the two system buses. The CPU 11 makes DMA transfer settings to the DMAC control unit 31C via the system bus 15-1. The DMAC control unit 31 may be configured such that the expansion registers 41 of the virtual channels 32 are used to distinguish between the system bus 15-1 and the system bus 15-2.

Further, the present invention is not limited to these embodiments, but various variations and modifications may be made without departing from the scope of the present invention.

What is claimed is:

1. A DMA transfer system, comprising:
a DMA controller having at least one CPU channel and at least one extension channel coupled to a system bus, the DMA controller configured to perform a DMA transfer via the system bus according to a DMA transfer setting of said at least one channel;
a CPU coupled to the system bus; and
a Direct Memory Access Controller (DMAC) control unit coupled to the DMA controller,
wherein the DMAC control unit includes:
a plurality of virtual channels configured to have respective DMA transfer settings made thereto;
a virtual channel arbiter configured to select one of the plurality of virtual channels; and
a DMA setting circuit configured to read a first DMA transfer setting of the selected virtual channel to write the first DMA transfer setting to said at least one extension channel of the DMA controller,
wherein each of said at least one CPU channel and said at least one extension channel includes:
a DMA control circuit configured to serve as a bus master of the system bus; and
a channel register,
wherein the plurality of virtual channels of the DMAC control unit includes respective virtual channel registers,
wherein the first DMA transfer setting is first stored in a virtual channel register of the selected virtual channel via the system bus, and is next set for actual channel configuration from the virtual channel register of the selected virtual channel to the channel register of said at least one extension channel, followed by being utilized to perform a DMA transfer,
wherein a second DMA transfer setting is first set for actual channel configuration to the channel register of said at least one CPU channel via the system bus, and is next utilized to perform a DMA transfer, and
wherein paths for making DMA transfer settings include a first path and a second path, the first DMA transfer setting being made to said at least one extension channel via the first path, the second DMA transfer setting being made to said at least one CPU channel via the second path, the first path including the system bus and the virtual channel registers, the second path including the system bus, the first path and the second path being different from each other and overlapping each other only on the system bus.

2. The DMA transfer system as claimed in claim 1, wherein the DMAC control unit is coupled to the system bus so that the plurality of virtual channels are configured to have the first DMA transfer settings made thereto by the CPU via the system bus.

3. The DMA transfer system as claimed in claim 1, wherein the DMAC control unit further includes a write-back circuit configured to receive a signal indicative of DMA transfer completion from said at least one extension channel of the DMA controller to update a register content of the selected virtual channel.

4. The DMA transfer system as claimed in claim 1, wherein each of the plurality of virtual channels includes:
   an expansion register to store a first DMA transfer setting different from a first DMA transfer setting settable to said at least one extension channel of the DMA controller, wherein:
   the DMAC control unit is configured to control operation of the DMA controller in response to at least one of a content of the virtual channel register of the selected virtual channel and a content of the expansion register of the selected virtual channel.

5. The DMA transfer system as claimed in claim 4, wherein the expansion register includes an expansion address register configured to store at least one of a plurality of transfer source addresses when the DMA transfer performed by the DMA controller is directed to the plurality of transfer source addresses.

6. The DMA transfer system as claimed in claim 4, wherein the expansion register includes an expansion transfer mode register to specify a chain transfer when the DMAC control unit performs a pseudo chain transfer by writing first DMA transfer settings multiple times to said at least one extension channel of the DMA controller so as to cause the DMA controller to perform a plurality of DMA transfers.

7. The DMA transfer system as claimed in claim 1, wherein each of the plurality of virtual channels belongs to at least one group, and said at least one group is assigned in one-to-one correspondence to said at least one extension channel of the DMA controller, and wherein the virtual channel arbiter is configured to select one virtual channel from the virtual channels that belong to one of said at least one group.

8. The DMA transfer system as claimed in claim 7, wherein priority is assigned to each of said at least one group with respect to an operation that writes a first DMA transfer setting to said at least one extension channel of the DMA controller.

* * * * *